United States Patent
Hyde

(10) Patent No.: US 9,483,134 B2
(45) Date of Patent: Nov. 1, 2016

(54) SYSTEMS AND METHODS FOR ACTIVELY RESISTING TOUCH-INDUCED MOTION

(71) Applicant: Elwha LLC, Bellevue, WA (US)

(72) Inventor: Roderick A. Hyde, Redmond, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/517,381

(22) Filed: Oct. 17, 2014

(65) Prior Publication Data
US 2016/0110006 A1    Apr. 21, 2016

(51) Int. Cl.
G06F 3/041    (2006.01)

(52) U.S. Cl.
CPC ............ G06F 3/041 (2013.01); G06F 3/0414 (2013.01); G06F 3/0416 (2013.01); *G06F 2203/04105* (2013.01); *G06F 2203/04106* (2013.01)

(58) Field of Classification Search
CPC .......................... G06F 3/0416; G06F 3/0414
See application file for complete search history.

(56) References Cited

U.S. PATENT DOCUMENTS

| 5,563,632 | A | 10/1996 | Roberts | |
|---|---|---|---|---|
| 6,285,358 | B1 | 9/2001 | Roberts | |
| 7,102,621 | B2 | 9/2006 | Roberts | |
| 2002/0050984 | A1 | 5/2002 | Roberts | |
| 2006/0227114 | A1* | 10/2006 | Geaghan | G06F 3/044 345/173 |
| 2009/0100384 | A1* | 4/2009 | Louch | G06F 1/1626 715/863 |
| 2011/0175832 | A1* | 7/2011 | Miyazawa | G06F 3/041 345/173 |
| 2012/0105358 | A1* | 5/2012 | Momeyer | G06F 3/0414 345/174 |
| 2012/0169646 | A1* | 7/2012 | Berkes | G06F 3/0488 345/174 |
| 2014/0035829 | A1* | 2/2014 | Hyde | G06F 1/1694 345/173 |
| 2014/0125619 | A1* | 5/2014 | Panther | G06F 3/04883 345/173 |
| 2014/0129994 | A1* | 5/2014 | Louch | G06F 3/0488 715/863 |
| 2014/0132568 | A1* | 5/2014 | Hirose | G06F 3/016 345/175 |
| 2014/0197936 | A1* | 7/2014 | Biggs | G08B 6/00 340/407.1 |
| 2014/0198052 | A1* | 7/2014 | Tokutake | G06F 3/041 345/173 |
| 2014/0320431 | A1* | 10/2014 | Cruz-Hernandez | G06F 3/016 345/173 |
| 2015/0134572 | A1* | 5/2015 | Forlines | G06F 3/041 706/11 |
| 2015/0324084 | A1* | 11/2015 | Chen | G06T 11/80 345/173 |

* cited by examiner

Primary Examiner — Claire X Pappas
Assistant Examiner — Robert Stone
(74) Attorney, Agent, or Firm — Foley & Lardner LLP

(57) ABSTRACT

A system for actively resisting touch-induced motion includes a touchscreen device and a processing circuit. The touchscreen device includes one or more sensors configured to generate motion data based on a motion of a touchscreen display of the touchscreen device, where the motion is induced by a touch on the display. The touchscreen device further includes one or more motion control devices configured to apply a force to the display. The processing circuit is configured to determine, based on the motion data, a force to counteract the motion. The processing circuit is further configured to cause the motion control devices to apply a force to the display to counteract the motion of the display.

34 Claims, 5 Drawing Sheets

SYSTEMS AND METHODS FOR ACTIVELY RESISTING TOUCH-INDUCED MOTION

BACKGROUND

As touchscreens are made to be lighter and thinner, they may become less robust. A touchscreen may flex inward when a user touches the screen. As a consequence, the functionality of the touchscreen may be hindered due to its movement when touched. Additionally, such movement and flexure of the touchscreen can result in inaccuracies in the user's touch.

SUMMARY

One embodiment relates to a system for actively resisting touch-induced motion. The system comprises a touchscreen device and a processing circuit. The touchscreen device comprises one or more sensors configured to generate motion data based on a motion of a touchscreen display of the touchscreen device, wherein the motion is induced by a touch on the display, and one or more motion control devices configured to apply a force to the display. The processing circuit is configured to: determine, based on the motion data, a force to counteract the motion; and cause the motion control devices to apply a force to the display to counteract the motion of the display.

Another embodiment relates to a method of actively resisting touch-induced motion. The method comprises: generating, by one or more sensors, motion data based on a motion of a touchscreen display of the touchscreen device, wherein the motion is induced by a touch on the display. The touchscreen device comprises the one or more sensors, and one or more motion control devices configured to apply a force to the display. The method further comprises determining, based on the motion data, a force to counteract the motion; and applying a force, by the motion control devices, to the display to counteract the motion of the display.

Another embodiment relates to a non-transitory computer-readable medium having instructions stored thereon, the instructions forming a program executable by a processing circuit to actively resisting touch-induced motion of a touchscreen display of a touchscreen device. The instructions comprise instructions for receiving, from one or more sensors, motion data based on the motion of the display of the touchscreen device, wherein the motion is induced by a touch on the display. The touchscreen device comprises the one or more sensors, and one or more motion control devices configured to apply a force to the display. The instructions further comprises instructions for determining, based on the motion data, a location on the display corresponding to the touch; instructions for determining, based on the motion data and the touch location, a force to counteract the motion; and instructions for causing the motion control devices to apply a force to the display to counteract the motion of the display.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
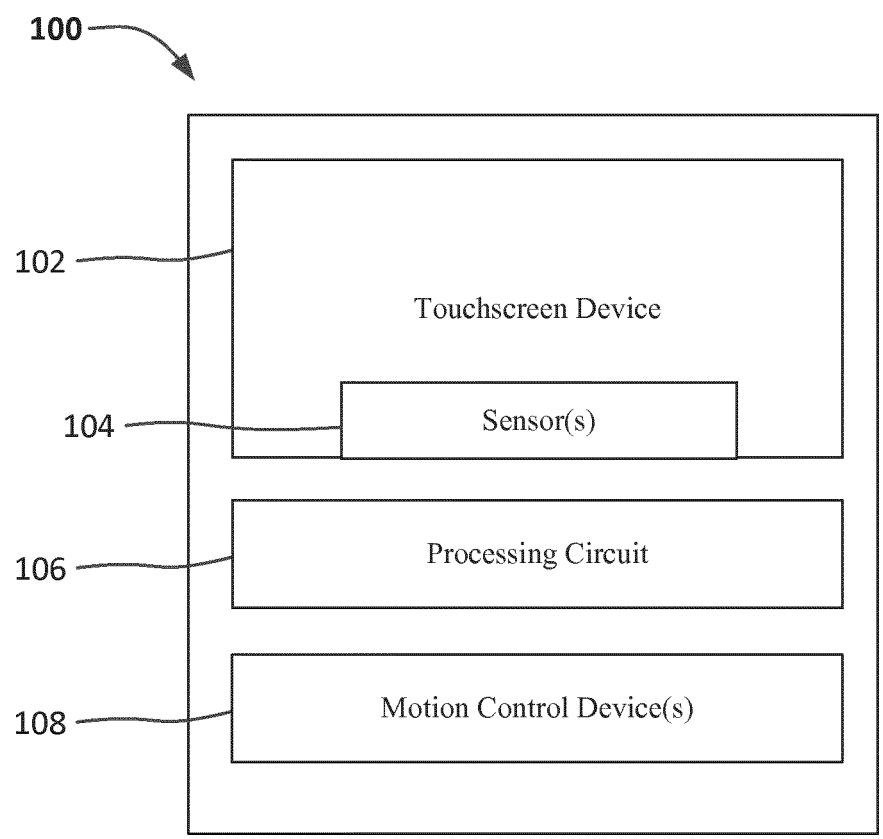
FIG. 1 is a motion-resistance system, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented here.

Referring generally to the figures, various embodiments of systems, methods, and computer readable media for actively resisting touch-induced motion are shown and described. As manufacturers design touchscreens to be thinner, a typical result is that they feel flimsy to a user during normal operation. For example, a user may be using a touchscreen interface on a device (e.g., on a laptop, a tablet, etc.) and the screen may flex or otherwise move when the user interacts with the device. This can result in inaccuracies in where the touchscreen system registers a detected touch. Further, to the user, the screen may feel poorly designed or cheaply manufactured. According to the disclosure herein, the touch-induced motion of the screen (e.g., its flexure, deformation, indentation, bending, etc.) may be detected and actively resisted. For example, one or more sensors can be used to detect the motion of the screen induced from a touch (e.g., from a user's finger, a stylus, etc.). The detected motion may be resisted by treating the touchscreen as a rigid body, and applying a force or torque to the screen (e.g., at the screen's mounting points) to counteract the motion-induced touch. As another example, the touchscreen may be treated as a flexible body, and the screen's internal flexure may be controlled at various points (e.g., the touch site, near the touch site, etc.) to resist the motion-induced touch. Knowledge of the touch site may be calculated based on data provided by the one or more sensors. Alternatively, a touch detection system of the touchscreen may determine a touch site or provide data related to a touch site. For example, the touchscreen may be based on various technologies (resistive, surface acoustic wave, capacitive, infrared, optical imaging, dispersive signal, acoustic pulse recognition, etc.) configured to detect a touch on the screen.

As discussed in further detail in the various embodiments, a touchscreen can actively resist motion upon a user's touch. For example, accelerometers, pressure sensors, or strain sensors may be positioned at various points of the screen (e.g., at or near mounting points, in a grid pattern behind the screen, etc.). Data from the sensors may be used by a processor to directly determine the motion of the screen induced by the touch or the data may be used to determine the force or torque applied by the touch and then used to indirectly determine the motion which will result from this force or torque. Knowledge of the motion can then be used to determine the force or torque required to counteract such motion. The counteracting force/torque can be used to counteract both the immediate touch-induced motion as well as to counteract dynamic motion (e.g., oscillations) which persists after the touch. The counteracting force/torque can be applied during the actual touch, and in some embodiments may be applied after a touch has ended in order to counteract motion induced by the touch. In various embodiments, a touch may be also predicted, and the screen may actively act in advance of the predicted touch.

The determination of the force/torque needed to counteract a touch-induced motion can be made based on preknowledge of the screen's response to forces/torques. For instance, in some embodiments, previous computation, history, or testing may determine the screen motion at various locations which will result from specified force/torque values applied by the motion control device. In one embodiment, a display device may comprise a number (e.g., M) of motion control devices, each capable of applying a force or torque to a specified location on the device. For each case, we can store a vector denoting the induced motion at each of a number (e.g., N) of locations on the display screen due to a unit-valued force/torque. The overall data structure can be represented as an N×M influence matrix relating motion at N locations induced by unit forces/torques applied by M motion control devices. Alternatively, an inverse influence matrix can be tabulated, representing the forces/torques needed by M motion control devices to offset motion at N locations. While actual touch sites may not precisely match one of the N matrix locations, we can extrapolate/interpolate values from nearby matrix elements to correspond to actual touch sites. The amount of force/torque that should be applied to counteract a measured motion at a touch site (or another specified site) may be readily determined with such predetermined influence matrices.

Another approach to determine the force/torque needed to counteract a touch-induced motion is empirical. A control loop can be implemented to sense a touch-induced motion, apply a counteracting force/torque, and re-sense the updated motion (now due to both the initial touch and to the force/torque). The updated motion may then be sensed to determine whether the force made the motion better or worse, the force may then be adjusted accordingly, and re-sensed again, and so on. This process may be repeated until the motion is sufficiently reduced.

Referring to FIG. 1, a block diagram of motion-resistance system 100 is shown, according to one embodiment. System 100 includes touchscreen device 102, which has one or more motion detection sensors 104. Touchscreen device 102 may be a primarily stationary (e.g., mounted to a wall, integrated into a fixture, etc.) touchscreen device reacting against a mount or a support. Touchscreen device 102 may also be handheld or otherwise mobile touchscreen device reacting against, e.g., a hand holding the device or a table top where the device is placed, etc. In one embodiment, touchscreen device 102 is a laptop. In another embodiment, touchscreen device 102 is a desktop. In another embodiment, touchscreen device 102 is a wall-mounted display. In another embodiment, touchscreen device 102 is integrated into a vehicle (e.g., a vehicle dashboard, a vehicle user interface, etc.). In another embodiment, touchscreen device 102 is a cellular phone. In another embodiment, touchscreen device 102 is a tablet computing device. Sensors 104 are generally configured to sense a motion of the touchscreen of touchscreen device 102. For example, sensors 104 may detect a linear or angular motion induced from a touch, a flexure of the touchscreen, a deformation of the touchscreen, a pressure induced on the touchscreen, etc. The angular motion may be detected between a display screen and mount. Sensors 104 may provide digital or analog data related to a sensed motion to be analyzed by processing circuit 106.

Sensors 104 may include one or more different types of sensors. In one embodiment, sensors 104 include one or more accelerometers, pressure sensors, and strain sensors. In one embodiment, pressure sensors measure pressure as a result of the applied touch. For example, in one embodiment, the pressure sensor multiplies the pressure times the area of the touch to determine the force of the touch. Sensors 104 can be integrated throughout the touchscreen (e.g., at the corners of the touchscreen, in a grid pattern behind the touchscreen, etc.) at various locations. Sensors 104 can also be coupled to various mounting points of the touchscreen, for example, where the touchscreen is coupled to a frame/bezel, or where the touchscreen is mounted to a surface (e.g., a wall, etc.). In some embodiments, such sensors can measure translational or angular motion between the display and mount (e.g., rotation of a hinge). If sensors 104 are not located directly at a location of a touch, processing circuit 106 may extrapolate/interpolate the data provided by sensors 104 to determine motion at the touch location. The location of a touch may be calculated based on the data provided by sensors 104. Alternatively, processing circuit 106 may interface with a touch system of touchscreen device 102 (e.g., capacitive sensors, resistive sensors, etc., which are based on the type of touchscreen technology in use) to obtain location information of touch as provided by the touch system. In one embodiment, sensors 104 further include the sensors of the touchscreen (e.g., capacitive sensors, infrared sensors, resistive sensors, optical sensors, acoustic-based sensors, etc.) configured to provided location information based on a user's touch (or a stylus' touch) on touchscreen device 102. Based on a location of a touch, and characteristics of the touch (e.g., force/magnitude of a touch, direction of a touch, timing of a touch, etc.), processing circuit 106 determines an amount and type of force to be applied to the touchscreen to counteract and resist the touch. A force may be applied to an area of the touch, or to an area that is different from the touch, depending on the type of touchscreen in use and the resistive measure being taken. Processing circuit 106 is the processing circuitry (e.g., processors, memory, etc.) of system 100 and includes the circuitry necessary to interface with the sensors, motion control devices, and other components discussed herein. In one embodiment, processing circuit 106 includes the processing components of touchscreen device 102. Processing circuit 106 is described in more detail herein with reference to processing circuit 400 of FIG. 4.

Based on data from sensors 104, processing circuit 106 determines an amount of force to be applied to the touchscreen to counteract motion induced by a touch, and processing circuit 106 controls one or more motion control devices 108 to counteract the motion. The force to be applied may depend on a configuration of motion control devices 108. Further, the entire touch-induced motion does not need to be resisted, but the motion may be primarily counteracted at a selected location (for instance, the location of where the screen was touched, the location of a key image, the center of the touchscreen, etc.). The momentum introduced to the screen from the touch may be transferred to other areas of the screen that are not currently being touched. As an example, motion control devices 108 may be coupled to the mounting points (or located nearby the mounting points) of the touchscreen. In this arrangement, a force may be applied to the mounting points or touchscreen to create a flexure in the touchscreen (and stiffen an area of the screen) to actively resist touch-induced motion. As another example, motion control devices 108 may be located at various points behind the touchscreen (e.g., in a grid pattern, etc.), and the internal flexure of the screen may be controlled by applying forces to the backside of the touchscreen.

In order to resist a touch-induced motion, motion control devices 108 may include one or more mechanical devices that can apply a force to the touchscreen. For example, motion control devices 108 may include tension-based supports that may operate on an internal hinge of the touchscreen. In such an embodiment, motion control devices 108 may increase a tension (e.g., via cables, braces, diagonal supports, bands, etc.) across a certain area of the touchscreen. This can stiffen the touchscreen at a location of a touch. Thus, in response to a touch that applies a net momentum to the touchscreen, the touchscreen may actively tension the touch site to shift the applied momentum from the tensioned area to a weaker part of the touchscreen (e.g., an area that is not being touched or tensioned by motion control devices 108). As another example, motion control devices 108 may include actuators positioned behind the touchscreen that are configured to apply pressure to the touchscreen. Accordingly, based on a position of a touch, one or more actuators may activate to counteract (e.g., press against the screen) a motion induced on the touchscreen by the touch. Such actuators may also include plates or other distribution elements configured to distribute a force applied to the touchscreen by the actuators. As another example, such motion control devices 108 may include actuators configured to apply a torque to various points of the touchscreen to control a flexure of the screen (e.g., to controllably bow/flex the screen).

Figure 2:
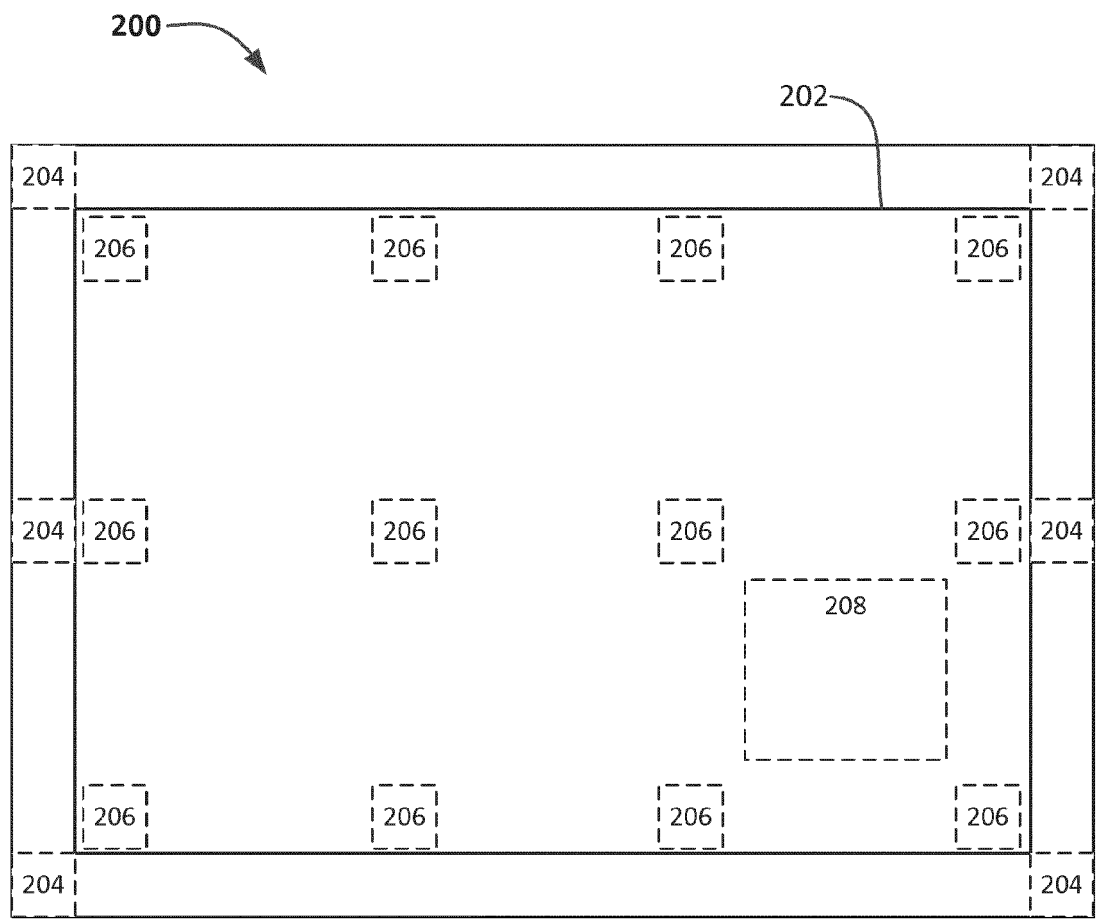
FIG. 2 is a touchscreen having a motion-resistance system, according to one embodiment.

Referring to FIG. 2, a touchscreen device 200 having a motion-resistance system is shown, according to one embodiment. Touchscreen device 200 includes touchscreen 202, which may be any type of touchscreen discussed herein. Touchscreen device 200 further includes processing circuit 208, a plurality of motion control devices 204, and a plurality of sensors 206 configured to detect a touch-induced motion of touchscreen 202. Although depicted as being in a grid pattern, sensors 206 may be located in any arrangement behind (or integrated within) touchscreen 202. In one embodiment, sensors 206 are located at the corners of touchscreen 202, or near mounting points of the screen. Sensors 206 may be or include accelerometers, pressure sensors, strain sensors, or a combination of sensors. Motion control devices 204 are depicted as being located near the mounting points of touchscreen 202. In one embodiment, motion control devices 204 are tension controlling device, where one device is coupled to another device (e.g., in a diagonal pattern, across the middle of touchscreen 202, etc.) or to an anchoring point of device 200 by a support. In such an embodiment, in response to a touch-induced force, processing circuit 208 determines a location of the touch and characteristics of the touch, and controls motion control devices 204 to counteract the force and motion induced by the touch. For example, processing circuit 208 may cause the top-left and bottom-right motion control devices 204 to increase a tension of a support coupled therebetween. As another example, processing circuit 208 may cause the middle control devices 204 to increase a tension of a support coupled therebetween. In another embodiment, motion control devices 204 are coupled to mounting points of touchscreen 202. In response to a touch-induced force, processing circuit 208 determines a location of the touch and characteristics of the touch, and controls motion control devices 204 to apply a force to the mounting points to torque (i.e., flex) touchscreen 202 and counteract the touch-induced force. To determine the location and the characteristics of the touch (e.g., determine a force amount, calculate an induced momentum, determine a linear motion induced by the touch, determine an angular motion induced by the touch, etc.), the processing circuit 208 analyzes the data provided by sensors 206. Processing circuit 208 may interpolate or extrapolate the data if a touch location is not directly over a sensor. In one embodiment, processing circuit 208 may further communicate with a touch detection system of touchscreen 202 (e.g., a touch detection system of a commercially available touchscreen, etc.). Such a touch detection system can provide location information when a touch is detected, and processing circuit 208 may utilize such information in determining how to control the motion control devices 204 to counteract a touch.

Figure 3:
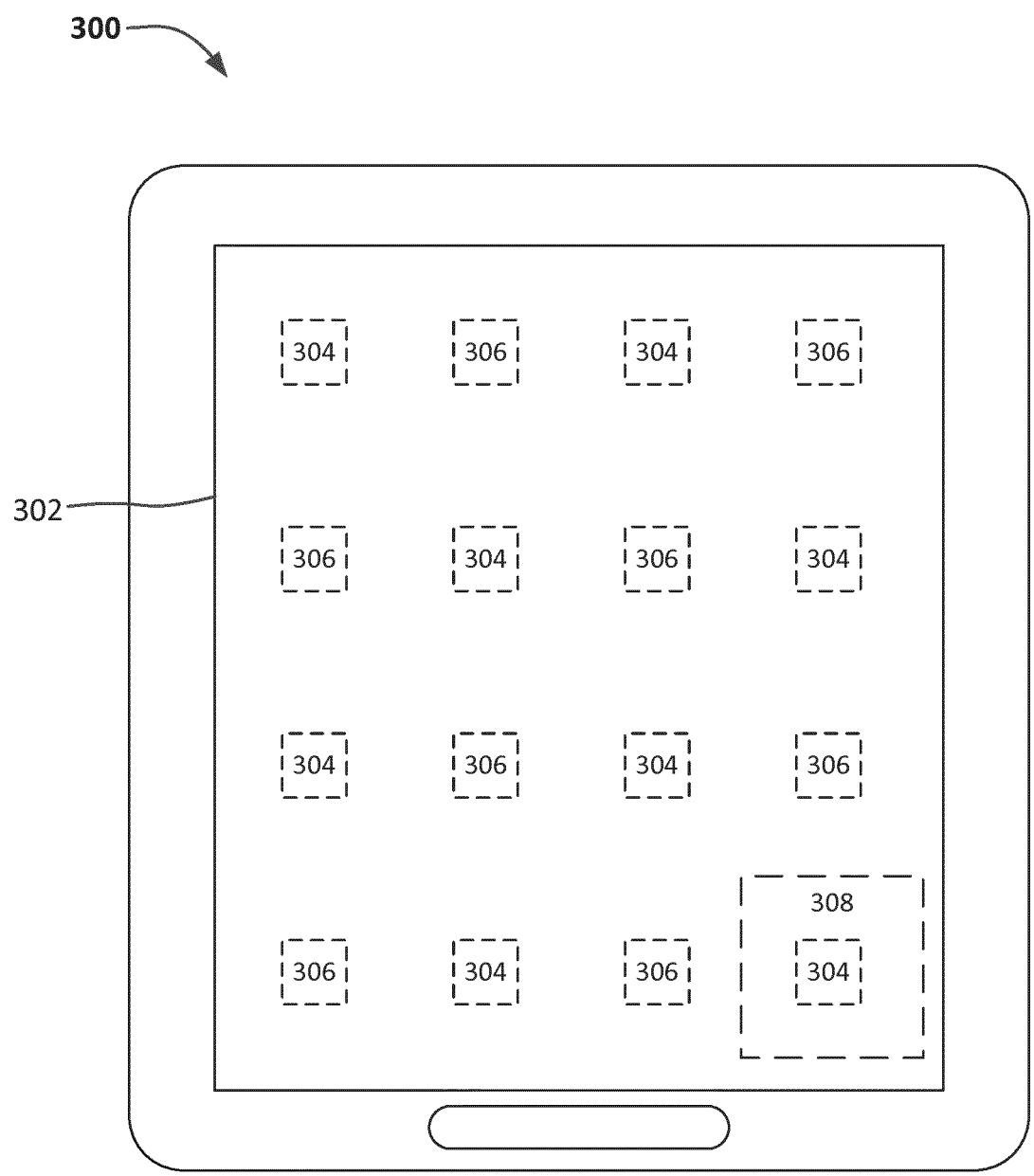
FIG. 3 is a touchscreen having a motion-resistance system, according to one embodiment.

Referring to FIG. 3, a touchscreen device 300 having a motion-resistance system is shown, according to one embodiment. Touchscreen device 300 includes touchscreen 302, which may be any type of touchscreen discussed herein. Touchscreen device 300 includes processing circuit 308, a plurality of motion control devices 304, and a plurality of sensors 306 configured to detect a touch-induced motion on touchscreen 302. In one embodiment, motion control devices 304 are arranged in a grid pattern behind (or coupled to) touchscreen 302. For example, motion control devices 304 may be or include actuators configured to apply a force to touchscreen 302. Sensors 306 are depicted in a grid pattern behind (or coupled to) touchscreen 302. Motion control devices 304 may be paired with a sensor 306, or motion control devices and sensors 306 may be independently positioned. Sensors 306 may be or include accelerometers, pressure sensors, strain sensors, or a combination of sensors. In response to data provided by sensors 306, processing circuit 308 interprets a motion induced on touchscreen 302 (e.g., by determining a location of a touch, an amount of motion, etc.). Processing circuit 308 may also utilize data from an integrated touch detection system of touchscreen 302 in determining a location of a touch. Based on analyzing data from sensors 306, processing circuit 308 determines which motion control devices 304 to activate, and how much force should be applied to touchscreen 302 in order to actively resist the motion induced on touchscreen 302 by a touch. As discussed further below, processing circuit 308 may also receive data from applications running on touchscreen device 300 in order to predict an upcoming touch, and thereby actively begin motion resistance prior to the occurrence of the touch.

Figure 4:
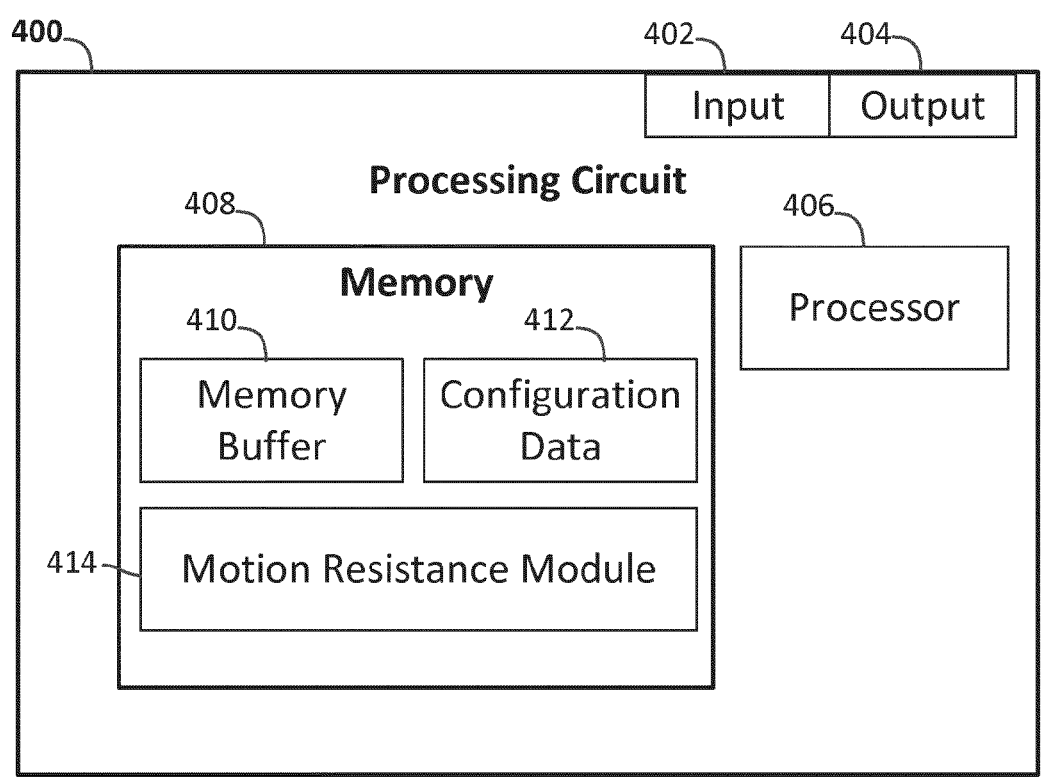
FIG. 4 is a block diagram of a processing circuit of a motion-resistance system, according to one embodiment.

Referring to FIG. 4, a detailed block diagram of processing circuit 400 for implementing the systems and methods of the present disclosure is shown according to one embodiment. Processing circuit 400 may be any of the processing circuits discussed herein. Processing circuit 400 is generally configured to receive data from motion detection sensors (e.g., accelerometers, pressure sensors, strain sensors, etc.) and utilize the data to control the operation of motion control devices (e.g., tensioners, actuators, etc.). Processing circuit 400 may be or include the processing components of a touchscreen device. As one example, processing circuit 400 can generate signals required to activate or deactivate motion control devices, and control the force exerted by the motion control devices. As another example, processing circuit 400 may generate signals needed to communicate with a touch detection system of a touchscreen device in order to determine a location of a touch on the touchscreen. As another example, processing circuit 400 may generate signals necessary to communicate with motion detection sensors to determine characteristics of a touch. Processing circuit 400 is further configured to receive configuration and preference data. Processing circuit 400 may analyze this data to determine sensitivities and other operational characteristics related to the motion control devices, which may be specified by a user or manufacturer. In analyzing data provided by motion detection sensors and controlling the operation of motion control devices, processing circuit 400 may make use of machine learning, artificial intelligence, interactions with local and/or remote databases and database table lookups, pattern recognition and logging, intelligent control, neural networks, fuzzy logic, etc.

According to one embodiment, processing circuit 400 includes processor 406. Processor 406 may be implemented as a general-purpose processor, an application specific integrated circuit (ASIC), one or more field programmable gate arrays (FPGAs), a digital-signal-processor (DSP), a group of processing components, suitable electronic processing components, or any commercially available processor. Processing circuit 400 also includes memory 408. Memory 408 is one or more devices (e.g., RAM, ROM, flash memory, hard disk storage, etc.) for storing data and/or computer code for facilitating the various processes described herein. Memory 408 may be or include non-transient volatile memory or non-volatile memory. Memory 408 may include database components, object code components, script components, or any other type of information structure for supporting the various activities and information structures described herein. Memory 408 may be communicably connected to processor 406 and include computer code or instructions for executing the processes described herein.

Memory 408 may include memory buffer 410. Memory buffer 410 is configured to receive a data stream (e.g., data from sensors 104, data from motion control devices 108, data from a user input device, etc.) through input 402. For example, the data may include a real-time stream of sensor data, etc. The data received through input 402 may be stored in memory buffer 410 until memory buffer 410 is accessed for data by the various modules of memory 408. For example, motion resistance module 414 can access the data that is stored in memory buffer 410.

Memory 408 further includes configuration data 412. Configuration data 412 includes data related to processing circuit 400. For example, configuration data 412 may include information related to interfacing with other components (e.g., sensors of system 100, components of devices 200 or 300, a user input device, etc.) and can include data required to configure communication between the various components of processing circuit 400. This may include the command set needed to interface with a computer system used to transfer user settings or otherwise set up the motion resistance systems described herein. This may further include the command set needed to generate graphical user interface (GUI) controls, menus, warning information, feedback, and visual information. As another example, configuration data 412 may include the command set needed to interface with communication components (e.g., a universal serial bus (USB) interface, a Wi-Fi interface, an Ethernet interface, etc.) so that data (e.g., firmware, configuration settings, etc.) may be transferred to and from processing circuit 400. Processing circuit 400 may format data for output via output 404 to allow a user to configure the systems as described herein. Processing circuit 400 may also format visual information to be output for display on a display device. Processing circuit 400 may also generate commands necessary to drive actuators or mechanical motion control devices. Configuration data 412 may also include information as to how often input should be accepted from a sensor. Configuration data 412 may include default values required to initiate communication with sensors, motion control devices, or other peripheral systems (e.g., touch detection systems).

Processing circuit 400 further includes input 402 and output 404. Input 402 includes one or more inputs configured to receive a data stream (e.g., a stream of data from sensors), and configuration and preference information. Input data may be accepted continuously or periodically. Output 404 includes one or more outputs configured to provide output to other components of the systems as described herein. For example, output 404 may be utilized to control motion control devices. Output 404 may also be used to communicate with external systems, e.g., during a manufacturing or configuration process.

Memory 408 further includes motion resistance module 414 for executing the systems and methods described herein. Motion resistance module 414 may access received sensor data, configuration information, user preference data, and other data as provided by processing circuit 400. Motion resistance module 414 is generally configured to analyze the sensor data, determine a position and characteristics related to a touch of the corresponding touchscreen, and control motion control devices based on such analysis. Motion resistance module 414 may further interface with touch detection systems of a touchscreen device and software applications of the device. Motion resistance module 414 may also predict touches of the touchscreen, and control motion control devices based on such predictions. Motion resistance module 414 may be further configured to operate according to a user's preferences. Accordingly, the resistance of touch-induced motion may be enabled/disabled and configured according to a user's or manufacturer's desires. For example, a certain touchscreen may have flexure/stress limitations, and motion resistance module 414 may control the motion control devices so that the limitations are not exceeded.

In one embodiment, motion resistance module 414 is configured to treat a touchscreen as a rigid body and to appropriately control motion control devices to resist motion induced by a touch. For example, motion resistance module 414 may receive acceleration data from one or more accelerometers. Based on the acceleration data, motion resistance module 414 may determine that a touch is occurring, and may further determine a linear or angular acceleration of the touch on the screen. As another example, motion resistance module 414 may receive data from one or more strain or pressure sensors. Motion resistance module 414 may analyze such data to determine a flexure or deformation of the touchscreen induced by the touch. Knowledge of the site of the touch may be used by motion resistance module 414 to further interpret a touch. In some embodiments, motion resistance module 414 is configured to determine a touch site based on the data it receives from the sensors. In some embodiments, motion resistance module 414 may receive location information from a touch detection system (e.g., a capacitive or resistive based touch system, etc.) of the touchscreen. Data from a touch detection system may also be used in conjunction with sensor data to determine a touch site. Based on the touch site and the characteristics of the touch, motion resistance module 414 controls the motion control devices in order to resist motion induced by the touch. For example, motion induced by the touch may be resisted by applying a force to one or more of the mounting points of the touchscreen. In an embodiment where the touchscreen is primarily fixed (e.g., mounted to a wall, laying on/coupled to a rigid surface, etc.), the motion control devices may be coupled to such mounts. By applying a force to these mounts, a force may be applied to the touchscreen to counteract the motion induced by the touch. By applying a torque to these mounts, a torque may be applied to the touchscreen to counteract the motion induced by the touch. In another embodiment, a motion control device may be located in/on the touchscreen near its mount and apply force or torque between the touchscreen and mount in order to move the touchscreen. In one embodiment, the touchscreen supports detection of multiple touches at a time, and motion resistance module 414 may cause the motion control devices to counteract the multiple simultaneous touches.

In one embodiment, the motion control devices are arranged beneath a touchscreen, and motion resistance module 414 is configured to treat the touchscreen as a flexible body. In such an embodiment, motion resistance module 414 analyzes the data from the sensors (and a touch detection system, if available) to determine a touch site and characteristics of a touch. Motion resistance module 414 may cause the motion control devices to resist the touch-induced motion by actively controlling an internal flexure of the touch screen at or near the site of the touch. For example, an actuator may apply a force to the touchscreen to increase the screen's rigidity at a certain area. If the touch site is not directly over a motion control device, motion resistance module 414 may interpolate the sensor data of the touch to the touch site. For example, based on the interpolation, motion resistance module 414 may cause a motion control device to exhibit a greater (or weaker) force than it otherwise would have if the touch site had been located over the motion control device. Additionally, multiple touch control devices may be controlled simultaneously to achieve a desired flexure of the touchscreen. In one embodiment, the touchscreen supports detection of multiple touches at a time, and motion resistance module 414 may cause the motion control devices to adjust flexures of the touchscreen at multiple locations (e.g., to counteract the multiple simultaneous touches).

In one embodiment, motion resistance module 414 is configured to predict a touch and begin motion resistance measures prior to the touch. For example, motion resistance module 414 may maintain a user history of touches and motions induced on the touchscreen. Motion resistance module 414 may analyze the history of touches to predict typical touch characteristics (e.g., an average touch pressure, touch length, etc.). Motion resistance module 414 may interface with a camera of the touchscreen device to analyze a stream of images in order to predict a touch location and occurrence. Based on these predictions, motion resistance module 414 may cause the motion control devices to begin to resist a predicted touch. As another example, an application of the touchscreen device may maintain a history of user touches and corresponding characteristics (e.g., locations, forces, timing information, etc.). Based on such user history, the application may predict a touch will occur and provide such prediction information to motion resistance module 414. Upon receiving information of a predicted touch, motion resistance module 414 may be triggered to begin actively resisting the predicted touch at its predicted location. An application may further base its prediction on application requirements. For example, if an application generates a user interface menu having one or more user interface elements (e.g., an "ok" button, a "cancel" button, a touch location, scrollbar, etc.) the application may predict that a touch will soon occur at or near the user interface element. In this manner, if an application is requesting a user's input (e.g., to accept or cancel a prompt, to confirm an action, etc.) the application may provide location information to motion resistance module 414 so that motion resistance module 414 may begin actively resisting a predicted touch at the location specified by the application (e.g., the location of the requested user input, etc.). In one embodiment, motion resistance module 414 provides a service/application programming interface (API) for other applications to utilize. In this manner, a third party application may actively request, via the service, motion resistance module 414 to cause the motion control devices to resist a motion at a certain location. When providing such a request, various resistance parameters (e.g., a force/amount of resistance, a duration of resistance, etc.) may be specified by the application. Alternatively, motion resistance module 414 may determine how to appropriately resist the motion at the specified location, which may be based on a maintained history of touches or configuration settings.

Figure 5:
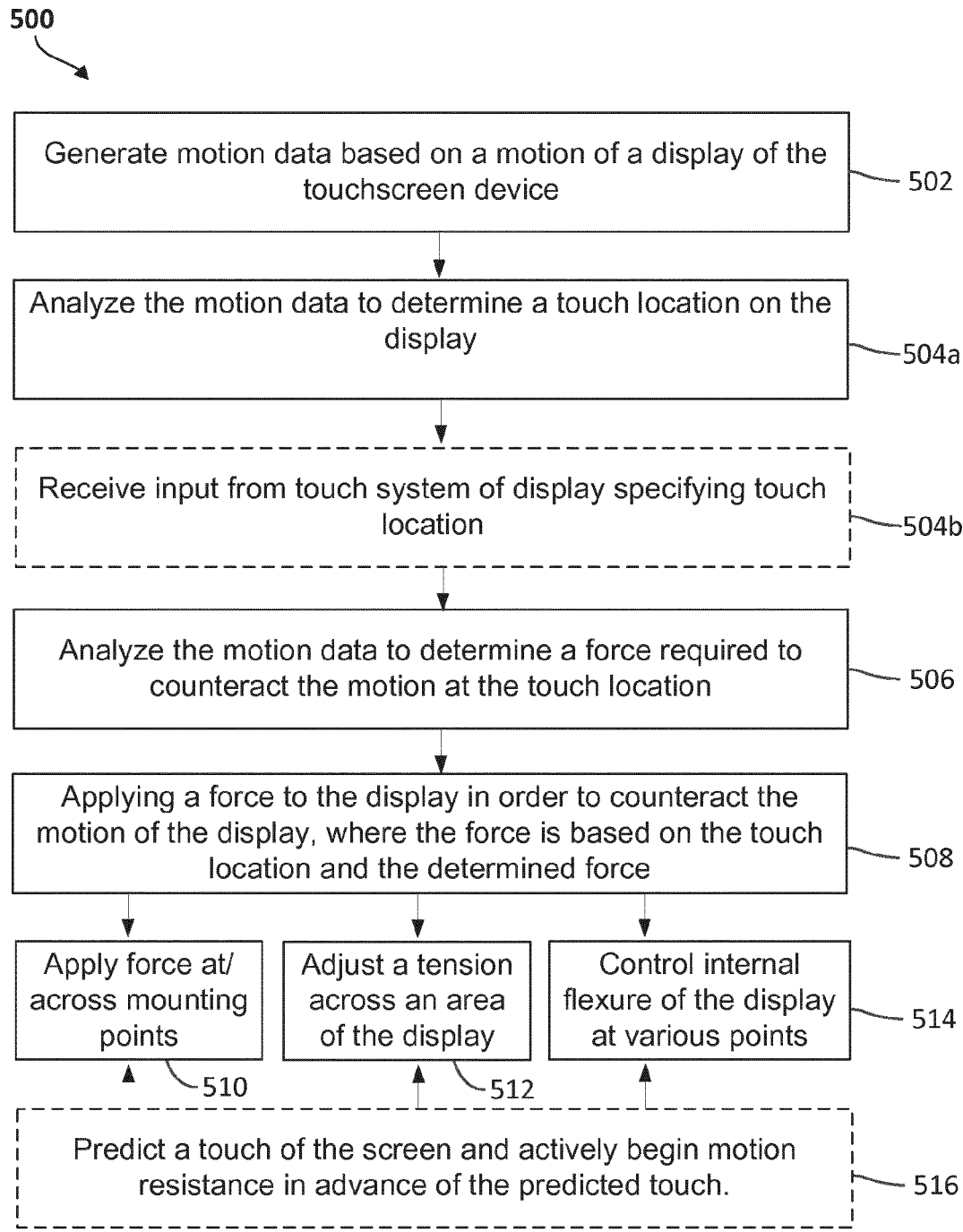
FIG. 5 is a flow diagram of a process for actively resisting touch-induced motion, according to one embodiment.

Referring to FIG. 5, a flow diagram of process 500 for actively resisting touch-induced motion is shown, according to one embodiment. In alternative embodiments, fewer, additional, and/or different actions may be performed. Also, the use of a flow diagram is not meant to be limiting with respect to the order of actions performed. Motion data is generated based on a touch-induced motion of a display (i.e., the screen) of a touchscreen device (502). For example, the motion can be induced by a touch from a user's finger or a stylus, etc. Various sensors may be used to detect the motion and generate the motion data. In one embodiment, accelerometers are utilized. In another embodiment, pressure sensors are utilized. In another embodiment, strain sensors are utilized. In another embodiment, a combination of the sensors discussed herein is utilized. Characteristics of the touch can be determined based on the motion data. For example, the motion data may be analyzed to determine or estimate a touch location on the display (504*a*). The location of the touch may also be determined by receiving data from a touch detection system of the display that specifies a touch location (504*b*). The motion data is further analyzed to determine a force (e.g., an amount and type of force) needed to counteract the motion at the touch location (506). For example, the amount of momentum transferred to the display (i.e., the force of the touch on the display) may be calculated by analyzing the motion data, and the amount of force required to counteract the momentum may be determined. A force is then applied to the display in order to appropriately counteract the touch-induced motion of the display, and the force is applied based on the touch location and the determined force (508). The force applied may be generated by any of the motion control devices as discussed herein. For example, a force/torque may be applied at or near the mounting points of the display (510). As another example, a tension may be increased across different points of the display (512). As another example, an internal flexure of the display may be controlled at one or more locations (514). In some embodiments, a touch may be predicted, and motion resistance may begin prior to the predicted touch (516).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented or modeled using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system for actively resisting touch-induced motion, comprising:
   a touchscreen device, comprising:
      a sensor configured to generate motion data associated with motion of a touchscreen display of the touchscreen device, wherein the motion is induced by a touch on the display; and
      a motion control device configured to apply a force to the display; and
      a processing circuit configured to:
         determine, based on the motion data, a force to counteract the motion;
         cause the motion control device to apply the force to the display to counteract the motion of the display;
         predict a future touch location;
         predict a future motion of the display; and
         cause the motion control device to apply a force to the display based on the future touch location and the future motion.

2. The system of claim 1, wherein the motion data comprises acceleration of at least a portion of the display.

3. The system of claim 1, wherein the motion data comprises displacement of at least a portion of the display.

4. The system of claim 1, wherein the motion data comprises a force value applied by the touch to at least a portion of the display.

5. The system of claim 1, wherein the processing circuit is further configured to determine, based on the motion data, a touch location on the display corresponding to the touch.

6. The system of claim 5, wherein the force is applied to an area that is different than the touch location.

7. The system of claim 5, wherein the force is applied to an area that is the same as the touch location.

8. The system of claim 1, wherein the motion control device is arranged beneath a surface of the display.

9. The system of claim 1, wherein the sensor includes an accelerometer coupled to the display.

10. The system of claim 1, wherein determining the force to counteract the motion includes determining a touch location on the display, and determining a motion of the display at the touch location induced by the force.

11. The system of claim 1, wherein counteracting the motion of the display comprises counteracting the motion at a touch location on the display.

12. The system of claim 1, wherein counteracting the motion of the display comprises counteracting the motion at an image location on the display.

13. The system of claim 1, wherein the force is applied after the touch.

14. The system of claim 1, wherein the force is applied during the touch.

15. The system of claim 1, further comprising a touch sensor configured generate touch data based on a touch of the display.

16. The system of claim 15, wherein a touch location is determined based on the touch data.

17. A display device for actively resisting touch-induced motion, comprising:
   a touchscreen;
   a sensor configured to generate motion data associated with motion of the touchscreen, wherein the motion is induced by a touch on the touchscreen; and
   a motion control device configured to apply a force to the touchscreen;
   a processing circuit configured to:
      cause the motion control device to apply a force to the touchscreen to counteract the motion of the touchscreen, wherein the force is determined based on the motion data;
      predict a future touch location;
      predict a future motion of the touchscreen; and
      cause the motion control device to apply a force to the touchscreen based on the future touch location and the future motion.

18. The device of claim 17, wherein the sensor includes a strain sensor coupled to the touchscreen.

19. The device of claim 18, wherein the force to counteract the motion is determined based on a flexure of the touchscreen.

20. The device of claim 18, wherein the force to counteract the motion is determined based on a deformation of the touchscreen.

21. The device of claim 17, wherein the processing circuit is configured to determine the force to counteract the motion based on:
   determining that a touch location corresponding to the touch and a location of the motion control device are different; and
   responsive to determining that the touch location and the location of the motion control device are different, determining the motion data corresponding to the touch location.

22. The device of claim 17, wherein the future touch location is predicted based on data provided by an application running on the display device, and wherein the future motion is predicted based on a history of the user touching the touch location.

23. The device of claim 22, wherein the history of the user includes a history of the user using the application involving at least one previous touch location and a corresponding previous motion of the touchscreen.

24. The device of claim 17, wherein the future touch location is predicted based on data provided by an application running on the display system, and wherein the future motion is predicted based on a history of one or more users touching the touch location.

25. The device of claim 17, further comprising a camera, and wherein the future touch location is predicted based on data from the camera.

26. The device of claim 17, wherein the future motion is predicted based on an application requirement of an application running on the display device.

27. The device of claim 26, wherein the application requirement includes a request for user input.

28. The device of claim 17, wherein the display device includes at least one of a laptop, a desktop, a vehicle interface, a cell phone, and a tablet computer.

29. A display system for actively resisting touch-induced motion, comprising:
   a touchscreen:
      a processing circuit configured to:
         predict a future touch location on the touchscreen corresponding to an expected touch;
         predict a future motion of the touchscreen based on the expected touch;
         determine, based on the future motion and the future touch location, a force to counteract the motion; and
         cause a motion control device to apply the force to the touchscreen.

30. The system of claim 29, wherein the force is applied to an area that is different than the future touch location.

31. The system of claim 29, wherein the force is applied to an area that is the same as the future touch location.

32. The system of claim 29, wherein the force is determined based on a predicted internal flexure of the touchscreen.

33. The system of claim 29, wherein the force is determined based on a predicted linear motion of the touchscreen.

34. The system of claim 29, wherein the force is determined based on a predicted flexure of the touchscreen.

* * * * *